United States Patent
Sukumaran

(10) Patent No.: US 12,416,773 B2
(45) Date of Patent: Sep. 16, 2025

(54) EXTERNAL FILTER HOLDER ARRANGEMENT IN OPERATIVE MICROSCOPES FOR FLUORESCENCE GUIDED SURGERY

(71) Applicant: Arvind Sukumaran, Trichy (IN)

(72) Inventor: Arvind Sukumaran, Trichy (IN)

( * ) Notice: Subject to any disclaimer, the term of this patent is extended or adjusted under 35 U.S.C. 154(b) by 493 days.

(21) Appl. No.: 17/906,067

(22) PCT Filed: Mar. 9, 2021

(86) PCT No.: PCT/IN2021/050225
§ 371 (c)(1),
(2) Date: Sep. 10, 2022

(87) PCT Pub. No.: WO2021/181411
PCT Pub. Date: Sep. 16, 2021

(65) Prior Publication Data
US 2023/0121732 A1   Apr. 20, 2023

(30) Foreign Application Priority Data
Mar. 11, 2020   (IN) .............................. 202041010288

(51) Int. Cl.
G02B 7/00 (2021.01)
G02B 21/00 (2006.01)
G02B 21/16 (2006.01)

(52) U.S. Cl.
CPC ......... *G02B 7/006* (2013.01); *G02B 21/0012* (2013.01); *G02B 21/16* (2013.01)

(58) Field of Classification Search
CPC ................................................ G02B 7/006
See application file for complete search history.

(56) References Cited

U.S. PATENT DOCUMENTS

| 6,414,805 | B1 * | 7/2002 | Reichman | G02B 21/06 |
| | | | | 359/361 |
| 6,563,113 | B1 * | 5/2003 | Amann | G02B 7/02 |
| | | | | 359/380 |
| 6,700,714 | B2 * | 3/2004 | Zeller | G02B 7/182 |
| | | | | 359/822 |
| 8,398,263 | B2 | 3/2013 | Tafas et al. | |
| 8,941,916 | B2 * | 1/2015 | Heise | G02B 21/34 |
| | | | | 359/391 |

(Continued)

FOREIGN PATENT DOCUMENTS

WO   2002001272 A1   1/2002

*Primary Examiner* — Edmond C Lau
(74) *Attorney, Agent, or Firm* — Novel Patent Services LLC

(57) ABSTRACT

The present disclosure provides an external filter holder arrangement that comprises a pair of filter holding slots to hold two different filters such as barrier filter and excitation filter to thereby fit into any type of xenon source light microscope. The external filters holder design can be used in any type of operative microscopes by altering the dimensions of the slots and the holding mechanism. The external filter holder 100 uses various combinations of filters that can be used in the same module which aids to carry out different surgeries such as angiogram, tumour surgery, urology and thereof. Thus, the external filter holder arrangement 100 is universal, cost-effective and can be customized to various older or base variant xenon light source microscopes.

7 Claims, 3 Drawing Sheets

(56) References Cited

U.S. PATENT DOCUMENTS

| | | |
|---|---|---|
| 9,348,130 B2 | 5/2016 | Bohm et al. |
| 2005/0270639 A1 | 12/2005 | Miki |
| 2010/0044583 A1 | 2/2010 | Steffen et al. |
| 2018/0372641 A1* | 12/2018 | Osman .................. A61B 90/20 |

* cited by examiner

EXTERNAL FILTER HOLDER ARRANGEMENT IN OPERATIVE MICROSCOPES FOR FLUORESCENCE GUIDED SURGERY

FIELD OF THE INVENTION

The present disclosure generally relates to the technical field of apparatus for optically examining objects, and in specific relates to an external filter holder arrangement that comprises a pair of filter holding slots to hold two different filters such as barrier filter and excitation filter to thereby fit into any type of operative microscope.

BACKGROUND OF THE INVENTION

Surgical treatment of brain tumors involves the removal of unusual or pathological tissue while retaining normal areas. In aggressive tumors like glioblastoma, the extent of tumour resection correlates with the period of tumour freedom and survival. Therefore, a surgeon endeavors to recognize the pathological tissue from neighboring zones of normal tissue and to visualize and identify limits of pathological tissue, so that the pathological tissue might be maximally removed without damaging the surrounding normal brain tissues. Hence, most brain tumour surgeries are done under a microscope that aids in good lighting and magnification, and this has revolutionized the surgical accuracy, over half a century.

Preoperative imaging modalities like CT, MRI and thereof aid in assessing the location and characteristics of the tumour. However, intraoperative tumour demarcation is essential for safe and maximal resection. Modalities such as intraoperative MRI, intraoperative USG provide inadequate resolution at the microscopic level, and these modalities do not provide the demarcation data during the surgery.

Stereotaxic systems coupled with advanced imaging techniques localize tumour margins based upon the preoperative CT or MRI scans. However, intraoperative brain shifts reduce the value of these modalities, since the whole guidance is based on preoperative images. Neurosurgery is peculiar in that, the surgeon cannot afford to resect a wide margin of normal tissue around the tumour, since every bit of normal brain is preferably preserved. Hence, even while being aggressive in tumour removal, a surgeon has to be sure that it is only the tumour he resects. This microsurgical endeavor is vastly aided only by intraoperative tumour fluorescence, which can exactly differentiate the normal and abnormal tissues while operating under the microscope. In addition, the ability to observe the tumour with and without the barrier filter; after exciting it with the excitation spectrum, confers additional specificity and other additional benefits.

Intraoperative angiography is essentially looking at the intraluminal blood flow pattern, and blood vessel patency, during surgery. There are surgeries for arteriovenous malformations (AVMs), where it is essential to identify the artery (the vessels that brings "in" the blood) and the draining vein (the vessel that takes "out" the blood). It can be catastrophic if the vein is blocked in the early part of surgery mistaking it for an artery. Normally they can be identified easily by visual inspection, but it is difficult to distinguish an artery from a vein in an AVM. Since outwardly they look similar, only the blood flow direction, that happens within the wall (intraluminal) and can distinguish them. Hence, there is a need for a system that can assess the intraluminal blood flow pattern which is essential in such surgeries.

In certain other surgeries like brain aneurysm surgeries, there is a need to assess the completion of aneurysm occlusion, and the patency of the blood vessel distal to the clip that surgeon need to apply on the aneurysm. This is too dependent on identifying the intraluminal flow of blood. In certain other surgeries, the blood vessel anastomosis (stitching together of two blood vessels), and the patency of the anastomoses needs to assessed which thereby again depends on identifying the intraluminal flow. All these are accomplished by intraoperative angiography.

Hence, there exists a need of a system for intraoperative distinguishing of tumour from normal brain during a tumour surgery and intraoperative angiography during a vascular surgery. Both these surgeries involve usage of different barrier filters to achieve the purpose in the best possible way. Hence, a system that allows interchange of the filters, and the option of removing the barrier filter alone, achieves the best possible visualization in both vascular and tumour surgeries.

In the existing commercially available technology, the barrier filter cannot be removed independently during surgery, and the barrier filter cannot be changed either. Moreover, they are inbuilt within the microscope system, and generally not available in the lower priced or older microscopes.

Therefore, there is a need for an external filter holder arrangement that can hold two different filters such as barrier filter and excitation filter. There is a need for an external holder arrangement which can be fit into any type of operative microscope with low cost. There is a need for an interchangeable barrier filter holding slot that ensures the filter does not reflect the bright area of the microscope oculus. There is a need for an enhanced arrangement in which various combinations of excitation and barrier filters are used in the same module with different spectral characteristics in the slots to provide significant customization for the filter characteristics, to aid in tumour surgeries and vascular surgeries.

OBJECTIVES OF THE INVENTION

The primary objective of the invention is to provide an external filter holder arrangement that comprises a pair of filter holding slots to hold two different filters such as barrier filter and excitation filter to thereby fit into any type of xenon light source microscope.

Another objective of the invention is to provide an external filter holder design that can be used in any type of operative microscopes by altering the dimensions of the filter slots and the holding mechanism.

Another objective of the invention is to provide a filter holder slot arrangement that allows the barrier filter to be interchangeable.

The other objective of the invention is to use various combinations of filters that can be used in the same module which aids to carry out different surgeries such as angiogram, tumour surgery, urology and thereof.

The other objective of the invention is to provide a cost-effective and universal external filter holder arrangement that can be customized to various older or base variant xenon light source operative microscopes.

Further objective of the invention is to provide a simple narrow optical band pass filter arrangement that allows the wavelengths corresponding to the excitation spectrum of the fluoropore using the existing xenon light source of operating microscope.

SUMMARY OF THE INVENTION

The disclosure proposes an external filter holder arrangement in operative microscopes for fluorescence guided surgery. The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

In order to overcome the above deficiencies of the prior art, the present disclosure is to solve the technical problem to provide an external filter holder arrangement that comprises a pair of filter holding slots with different dimensions to hold two different filters such as barrier filter and excitation filter to thereby fit into any type of operative microscope. Further, the barrier filter holding slot allows the barrier filter to be interchangeable and comprises an inclined slope arrangement to ensure the filter does not reflect the bright area of the microscope oculus.

According to an aspect, the disclosure proposes an external filter holder arrangement in operative microscopes for fluorescence guided surgery. The external filter holder arrangement for operative microscopes comprises a first ring, a second mating ring, a tightening ring, and a third filter holding ring. The external filter holder arrangement provides a universal and cost-effective filter holder that fits into different microscopes due to its simple construction. The external filter holder arrangement involves narrow band pass filter to allow the wavelengths that correspond to the excitation spectrum of the fluoropore.

The first ring is configured with male projections and fitted on the opening groove of the microscope and the second mating ring is configured with female slot that receives the male projections of the first ring. The first ring is a silicon ring that aids to fit the overall external filter holder arrangement on the operative microscope. The tightening ring is configured to tighten and provide grip to the first ring and the second mating ring. The third filter holding ring which is fitted into the second mating ring is configured with a pair of filter slots, and wherein said pair of filter slots further comprises a primary filter slot with an excitation filter and a secondary filter slot which is arranged with an inclined slope and provided with an interchangeable barrier filter.

Specifically, the third filter holding ring houses various combination of filters in the same module which aids to carry out different surgeries such as angiogram, tumour detection surgery, urology, and thereof. The inclined slope of the secondary filter slot ensures that the filter does not reflect the bright area of the microscope oculus. The secondary filter slot either housed with the barrier filter or left uncovered and the primary filter slot remains in place to filter the incident light based on the type of the surgery being carried out. The various combinations of the primary and secondary filter slots are used in the same module with different spectral characteristics in the slots to provide significant customization for the filter characteristics. The third filter holding ring comprises locking features that aids to fit into the second mating ring at ease.

Further, objects and advantages of the present invention will be apparent from a study of the following portion of the specification, the claims, and the attached drawings.

DETAILED DESCRIPTION OF DRAWINGS

The accompanying drawings, which are incorporated in and constitute a part of the specification, illustrate an embodiment of the invention, and, together with the description, serve to explain the principles of the invention.

DETAILED INVENTION DISCLOSURE

Figure 1:
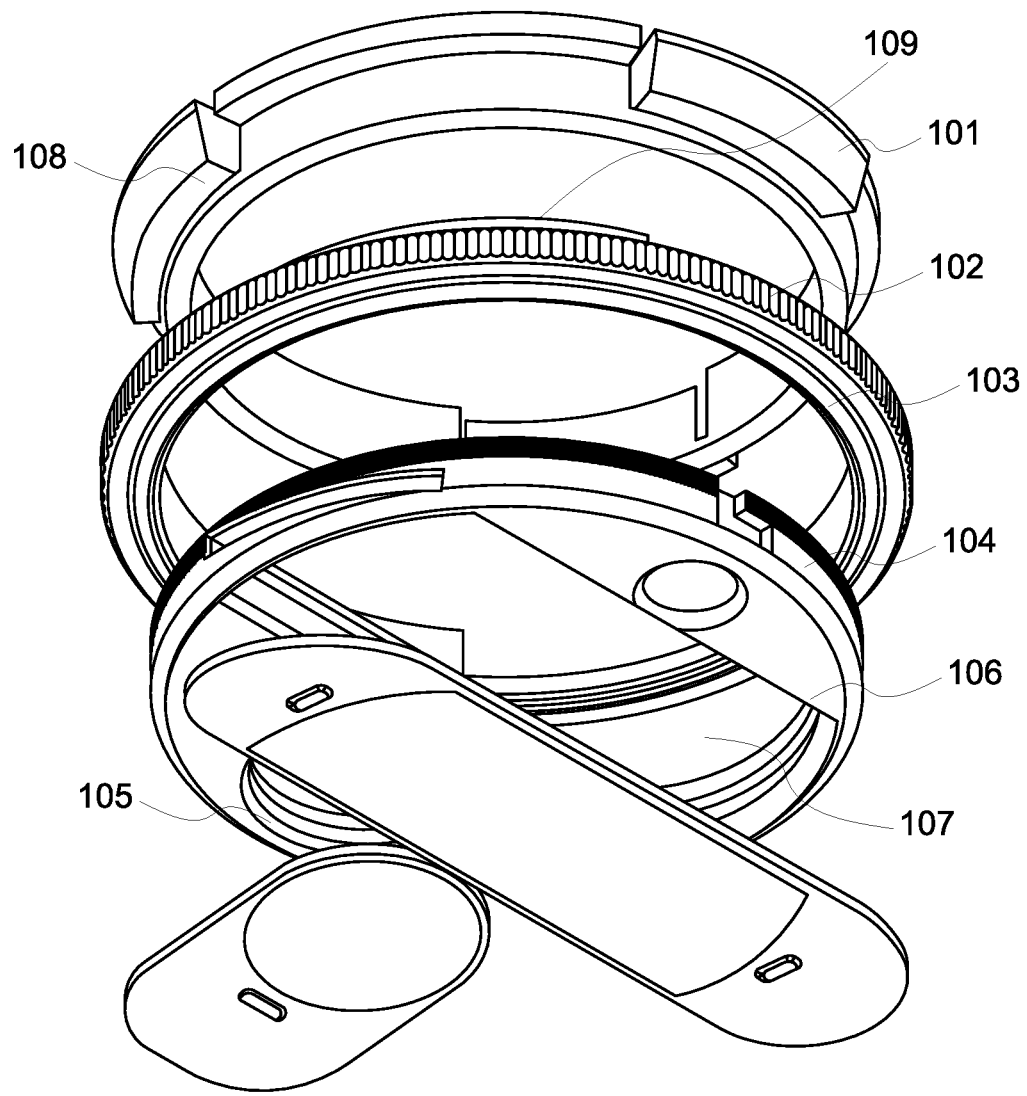
FIG. 1 illustrates a perspective view of an external filter holder arrangement for operative microscopes in accordance to an embodiment of the invention.
Figure 2A:
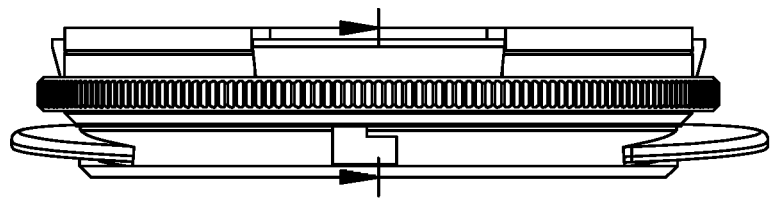
FIG. 2A depicts a side view of an external filter holder arrangement for operative microscopes in accordance to an embodiment of the invention.
Figure 2B:
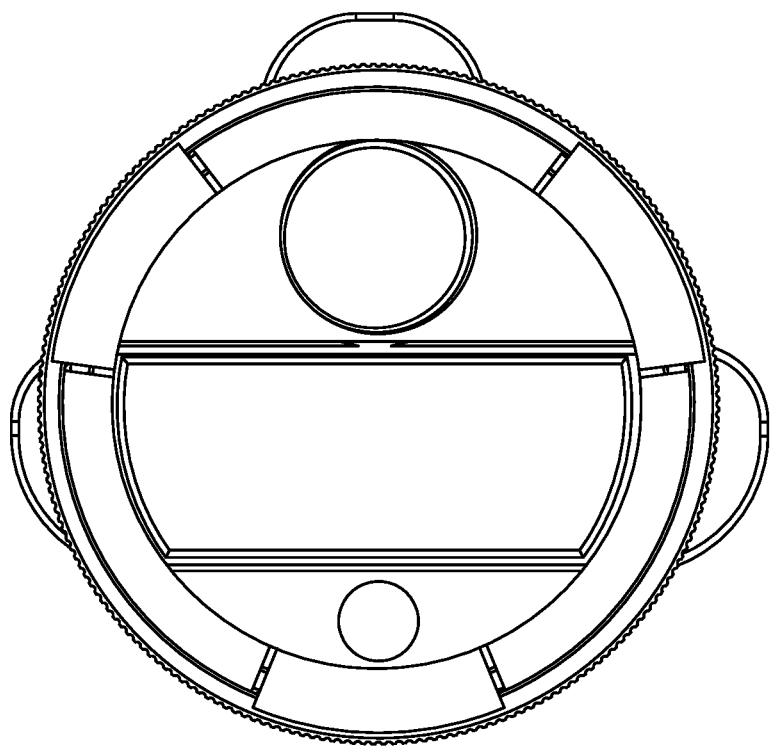
FIG. 2B depicts a bottom view of an external filter holder arrangement for operative microscopes in accordance to an embodiment of the invention.
Figure 2C:
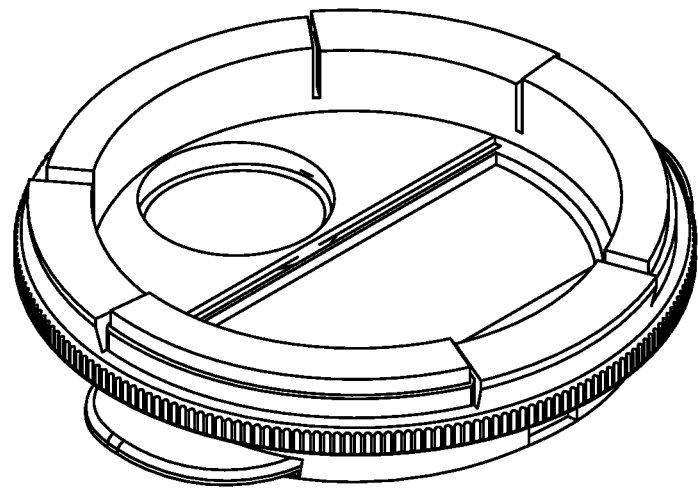
FIG. 2C depicts an isometric view of an external filter holder arrangement for operative microscopes in accordance to an embodiment of the invention.
Figure 2D:
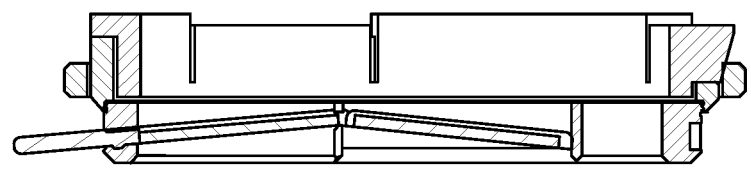
FIG. 2D depicts a cross-sectional side view of an external filter holder arrangement for operative microscopes in accordance to an embodiment of the invention.

Various embodiments of the present invention will be described in reference to the accompanying drawings. Wherever possible, same or similar reference numerals are used in the drawings and the description to refer to the same or like parts or steps.

The present disclosure has been made with a view towards solving the problem with the prior art described above, and it is an object of the present invention to provide an external filter holder arrangement that comprises a pair of filter holding slots to hold two different filters such as barrier filter and excitation filter to thereby fit into any type of operative microscope. Further, the barrier filter holding slot allows the barrier filter to be interchangeable and comprises an inclined slope arrangement to ensure the filter does not reflect the bright area of the microscope oculus.

According to an exemplary embodiment of the invention, FIG. 1 refers to a perspective view of an external filter holder arrangement 100 for operative microscopes.

The external filter holder arrangement 100 for operative microscopes comprises a first ring 101, a second mating ring 103, a tightening ring 102, a third filter holding ring 104, male projections 108, and a female slots 109. The external filter holder arrangement 100 provides a universal and cost-effective filter holder that fits into different microscopes due to its simple construction. The external filter holder arrangement 100 involves narrow band pass filter to allow the wavelengths that correspond to the excitation spectrum of the fluoropore.

The first ring 101 is configured with male projections 108 and fitted on the opening groove of the microscope and the second mating ring 103 is configured with female slots 109 that receive the male projections 108 of the first ring 101. The first ring is a silicon ring that aids to fit the overall external filter holder arrangement on the operative microscope. The tightening ring 102 is configured to tighten and provide grip to the first ring 101 and the second mating ring 103.

The third filter holding ring 104 which is fitted into the second mating ring 103 is configured with a pair of filter slots, and wherein the pair of filter slots comprises a primary filter slot 105 with an excitation filter and a secondary filter slot 106 which is arranged with an inclined slope 107 and provided with an interchangeable barrier filter.

Specifically, the third filter holding ring 104 houses various combination of filters in the same module which aids to carry out different surgeries such as angiogram, tumour detection surgery and thereof. The same module can be used for tumours as well intraoperative angiography. The inclined slope 107 of the secondary filter slot ensures that the filter does not reflect the bright area of the microscope oculus. The secondary filter slot 106 either housed with the barrier filter or left uncovered and the primary filter slot 105 remains in place to filter the incident light based on the type of the surgery being carried out. The various combinations of the primary 105 and secondary filter 106 slots are used in the same module with different spectral characteristics in the slots to provide significant customization for the filter characteristics. The third filter holding ring 104 comprises locking features that aids to fit into the second mating ring 103 at ease.

According to an exemplary embodiment of the invention, FIG. 2A to 2D refers to different views of an external filter holder arrangement for operative microscopes.

Firstly, a first ring with male projections is placed on the opening groove of the microscope and in the second step the second mating ring is placed on the first ring where the female slots of the second mating ring receives the male projections of the first ring. Then, the tightening ring is placed to tighten and provide grip to the attachment of first ring and the second mating ring. Further, a third filter holding ring is fitted into the attached connection of first and the second mating ring with a pair of filter slots. The pair of filter slots mainly comprises of a primary filter slot and a secondary filter slot. The primary filter slot is fitted with an excitation filter and the secondary filter slot comprises of an inclined slope and fitted with an interchangeable barrier filter based on the surgery being carried out.

The arrangement involves a simple narrow optical band pass filter that allows the wavelengths corresponding to the excitation spectrum of the fluoropore. In specific, the spectrum is placed between the 50 percentage of throughputs and the filter is made with specification between 475 to 520 nm with a peak at 490 nm.

Thus, the proposed disclosure provides an external filter holder arrangement that comprises a pair of filter holding slots to hold two different filters such as barrier filter and excitation filter to thereby fit into any type of xenon light source microscope. The external filters holder design can be used in any type of operative microscopes by altering the dimensions of the slots and the holding mechanism. The filter holder slot arrangement allows the barrier filter to be interchangeable to ensure that the filter does not reflect the bright area of the microscope oculus. The external filter holder uses various combinations of filters that can be used in the same module with different spectral characteristics in the slots which aids to carry out different surgeries such as angiogram, tumour surgery, urology, and thereof. Further, the external filter holder arrangement is universal, cost-effective and can be customized to various older or base variant xenon light source microscopes.

The proposed system comprises of a holder that allows for precise placements of the excitation filter and the barrier filter that helps to externally fit into a microscope. Additionally, it also helps in placements of different kinds of filters in the slots, which thereby allows significant customization of the filter characteristics. More particularly, the proposed system utilises the existing light source in the microscope and various combinations of excitation or barrier filters are used.

| | Barrier | | |
|---|---|---|---|
| Excitation | None | GY NBP | Y LP |
| B NBP | Tumour > Vascular | Vascular > Tumour | Tumour > Vascular |
| UV NBP | CNBU | Vascular | CNBU |
| UV + B DP | CNBU | Vascular | Tumour > vascular |

In the barrier filters, none indicates that no filter is suggested and the reflected light is directly received through the microscope. The GY NBP designates the green-yellow narrow band pass filter which allows the light between 515-550 nm. The Y LP designates the yellow long pass filter that eliminates the any light less than 520n.

In the excitation filters, the B NBP designates the blue narrow band pass filter that allows the light between 475 to 520 nm with a peak at 90 nm. The UV NBP designates the ultraviolet narrow band pass filter and the UV+B DP designates the ultraviolet+ blue double peak filter. At present, the pure UV NBP and the double peak UV+B DP filters are not available at least in a cost-effective way, but whereas in future filters may be available, become cheaper and can be used in the same system.

The arrangement helps in distinguishing the tumour fluorescence from xanthochromic discoloration and hemosiderin pigmentation (discoloration of the normal brain due to previous bleeding from tumour) if the barrier filter is removed. The external filter holder arrangement can also fit into a head fitted surgical loupe's light source.

It will readily be apparent that numerous modifications and alterations can be made to the processes described in the foregoing examples without departing from the principles underlying the invention, and all such modifications and alterations are intended to be embraced by this application.

I claim:

1. An external filter holder arrangement for operative microscopes, comprising:
    a first ring configured with male projections and fitted on the opening groove of the microscope;
    a second mating ring configured with female slots that receives said male projections of said first ring;
    a tightening ring configured to tighten and provide grip to said first ring and said second mating ring;
    a third filter holding ring fitted into said second mating ring and configured with a pair of filter slots, and wherein said pair of filter slots comprises:
        a primary filter slot fitted with an excitation filter;
        a secondary filter slot arranged with an inclined slope and provided with an interchangeable barrier filter,
    whereby said external filter holder arrangement provides a universal filter holder that fits into different microscopes.

2. The external filter holder arrangement for operative microscopes as claimed in claim 1, wherein said first ring is a silicon ring that aids to fit the overall external filter holder arrangement on said operative microscope.

3. The external filter holder arrangement for operative microscopes as claimed in claim 1, wherein said third filter holding ring houses various combination of filters in the same module which aids to carry out different surgeries such as angiogram, tumour detection surgery, urology, and thereof.

4. The external filter holder arrangement for operative microscopes as claimed in claim 1, wherein said inclined slope of said secondary filter slot is configured to reduce direct reflection of light from the microscope illumination source into the oculus.

5. The external filter holder arrangement for operative microscopes as claimed in claim 1, wherein said secondary filter slot either housed with the barrier filter or left uncovered and the primary filter slot remains in place to filter the incident light based on the type of the surgery being carried out.

6. The external filter holder arrangement for operative microscopes as claimed in claim 1, wherein different combinations of said primary and secondary filter slots are incorporated within the same module, and wherein each combination comprises filters with distinct spectral transmission properties, thereby allowing selection of filter characteristics based on the surgical application.

7. The external filter holder arrangement for operative microscopes as claimed in claim 1, wherein said third filter holding ring comprises locking features configured to enable secure and replaceable engagement with said second mating ring.

* * * * *